United States Patent [19]

Villettaz

[11] 4,439,455

[45] Mar. 27, 1984

[54] ENZYMATIC TREATMENT OF WINE AND MUST

[75] Inventor: Jean-Claude Villettaz, Arlesheim, Switzerland

[73] Assignee: Novo Industri A/S, Denmark

[21] Appl. No.: 387,204

[22] Filed: Jun. 10, 1982

[30] Foreign Application Priority Data

Jun. 11, 1981 [DK] Denmark .............................. 2532/81

[51] Int. Cl.$^3$ ........................ C12G 1/00; C12G 1/02; C12R 1/885
[52] U.S. Cl. ........................................ 426/12; 426/15; 435/945
[58] Field of Search .............................. 426/12, 15, 11; 435/945

[56] References Cited

U.S. PATENT DOCUMENTS 4,110,163 8/1978 Hj ortshoj et al. ............... 426/12 X

FOREIGN PATENT DOCUMENTS 1373487 11/1974 United Kingdom .
563434 6/1977 U.S.S.R. ................................. 426/15

OTHER PUBLICATIONS

Guggenhein et al., Purification and Properties of an α-(1-73) Glucanohydrolase From *Trichoderma harzianum,* J. Dent. Res., vol. 51, 1972, (pp. 394-401).

*Primary Examiner*—David M. Naff
*Attorney, Agent, or Firm*—Fidelman, Wolffe & Waldron

[57] ABSTRACT

The filterability of wine and must obtained from grapes infected with the mold *Botrytis cinerea* is improved by treatment thereof with an enzyme product produced by cultivating the microorganism *Trichoderma harzianum.* The enzyme product exhibits both alpha- and beta-glucanase activity.

8 Claims, 3 Drawing Figures

ENZYMATIC TREATMENT OF WINE AND MUST

INTRODUCTION

This invention relates to treatment of musts or wines derived from Botrytis infected grapes with the glucanase identifiable as the mutanase derived from *Trichoderma harzianum*. Such treatment substantially improves the filtration characteristics of the musts or wines.

BACKGROUND TO THE INVENTION

The mold, *Botrytis cinerea*, is found in all wine growing regions. This fungus infects the grapes whereby their skin becomes covered by the mold, the interior of the grape providing nutriment via the fungal mycelium. The infestation leads to a loss of water in the grape which causes the grape to shrink and concentrate the contents therein. In some regions the infestation by the mold is actively supported and eagerly sought by the wine grower because the resulting wines are generally considered to be of outstanding quality. This applies to, for example, all types of Spätlese, Sauternes, Hungarian Tokay and others.

However, the handling of musts and wines from Botrytis infected grapes usually confronts the wineries with technical obstacles in that they are more difficult to filter than those from non-infected grapes. Indeed, filtration takes substantially more time and may use as much as five to ten times more filter plates than is the case with a normal wine.

Recent investigations have revealed that the filtration difficulty is attributable to a glucan formed by the fungus, the glucan being present as a colloid in the must and in the wines fermented from the Botrytis infected grapes, in relatively small concentration, usually of the order of 5–400 mg per liter. Structurally, this glucan has been reported to be a beta-glucan with a 1,3-beta-glucan main chain and 1,6-beta-linked side chains. The average molecular weight is about 1 million Dalton. Although other types of colloid material are known to be present in wine in approximately the same weight proportion e.g., 200–700 mg/l, the filtration difficulty is believed to be almost entirely attributable to the above described beta-glucan.

As might perhaps be expected, once the filterability problem was attributed to the presence of a beta-glucan, workers in the art investigated the action of a large number of available beta-glucanases and cellulases on wines and musts from Botrytis infected grapes without, however, any noticeable degree of sucess. Thus, when testing such typical beta-glucanases as CEREFLO ® and FINIZYM ®, obtained from *Bacillus subtilis* and *Aspergillus niger*, respectively, the inventor hereof failed to observe any noticeable improvement of filtration rate, and similar negative results were found with CELLUCLAST ®, a cellulase originating from *Trichoderma reesei*. (The proprietary enzymes were supplied by NOVO INDUSTRI A/S, Denmark.)

The object of this invention is to provide an enzymatic treatment process that improves the filterability of musts and wines produced from Botrytis infected grapes.

BRIEF STATEMENT OF THE INVENTION

The process of this invention involves treatment of a must or a wine from Botrytis infected grapes with the glucanase produced by *Trichoderma harzianum*. This glucanase exhibits both alpha- and beta-glucanase activity, the former essentially stemming from its content of mutanase. The preferred dosage range of the glucanase per hectoliter of must or wine may be expressed in terms of its mutanase content as being from about 250 to about 10,000 mutanase units, which dosage contains also from about 50 to about 5,000 beta-glucanase units (both units as hereinafter defined), per gram of dry glucanase product, or an equivalent glucanase product in liquid form.

The duration of treatment and temperature range thereof are not critical but treatment would normally be from 8 hours to three weeks, usually for several days, at a temperature in the range of 15°–50° C. Treatment temperature should not exceed about 50° C.

Normally, the production of white wines includes a treatment of the must or wine with bentonite. Since bentonite substantially deactivates the glucanase, possibly through absorption thereof, the enzymatic treatment preferably should precede the treatment with bentonite.

DISCUSSION OF THE INVENTION

The glucanase product used in the present invention is obtained from *Trichoderma harzianum*. The cultivation of *Trichoderma harzianum* with the object of preparing an alpha-1,3-glucanase (i.e., mutanase) capable of hydrolyzing an alpha-1,3-glucan (i.e., mutan, believed to be a predominant constituent of dental plaque) is described in Great Britain Pat. No. 1,373,487 (B. Guggenheim et al.; see also: B. Guggenheim: Helv.odont. Acta 14 (1970) Suppl. V, pp. 89–108). However, the alpha-1,3-glucanase activity in the glucanase is believed to be ancillary to the activity on which practice of this invention is based.

A subsequent publication (see B. Guggenheim et al.: Journal of Dental Research 51 (1972) pg. 394–401) reported on the activity of purified *Trichoderma harzianum* glucanase fractions against a number of glucan substrates and advised of the presence therein of a laminarinase activity (laminarin being a 1,3-beta-glucan) and also of a (substantially weaker) hydrolyzing activity against *Sclerotium rolfsii* polysaccharide (a beta-glucan containing both 1,3- and 1,6-glycosidic bonds). However, as was the case with the typical beta-glucanases mentioned previously, the present inventor found commercially available laminarinase (supplied by Sigma Chemical Company, Calbiochem and Biocon Ltd.) to be essentially inactive for the purpose of this invention. Consequently, the striking effect of *Trichoderma harzianum* glucanase treatment on filtration difficulties stemming from Botrytis infestation is a surprising observation.

An exemplary industrial glucanase product employed for practice of this invention exhibited a mutanase activity of about 1,000 mutanase units per gram and from about 200 to about 500 beta-glucanase units per gram. One mutanase unit (MU) is defined as the amount of enzyme which under standard conditions (concentration of mutan 1.5 percent, 40° C., pH 5.5, reaction time 15 minutes) releases one micromol of reducing sugar (calculated as glucose) per minute from mutan.

As mentioned above, the mutanase of the Trichoderma glucanase product is not believed to contribute to the process of this invention. However, it is a general experience with microbial enzyme fermentations where no special optimization has occurred that several related enzyme components are produced at fairly constant ratios during cultivation of the microorganism. Such has been the experience with *Trichoderma harzianum,* a mixed activity glucanase being elaborated into the culture broth by the microorganism. In addition, proportionate recovery from the culture broth of filterability improving factor(s) in the glucanase product and mutanase in the glucanase product was found to be essentially independent of whichever of the traditional work-up procedures for recovery of the glucanase product was selected, i.e., precipitation either with a water-miscible organic solvent, such as acetone, or with a water-soluble inorganic salt, such as ammonium sulphate. Hence, characterization of the glucanase product recovered from cultivation of *Trichoderma harzianum* in terms of its mutanase activity provides the worker skilled in the art with adequate direction for practicing the present invention.

A reaction mixture consisting of 1 ml of 0.25 wt percent Botrytis glucan in 0.1 M citrate-phosphate (McIlvaine) buffer of pH 4.4 is incubated at 25° C. with 1 ml of suitably diluted glucanase solution for 5 minutes. The reaction is stopped by the addition of 2 ml of dinitrosalicylic acid reagent. The reduced sugar formed is determined according to the Summer and Somers method using glucose as standard. (Laboratory Experiments in Biol. Chem., Acad. Press 1944).

The activity of the glucanase product expressed in BGU was usually from one fifth to half of the activity in MU, the variation being a batch to batch variation.

Isolation of the beta-glucanase component from the glucanase product produced by *Trichoderma harzianum* or elimination of the mutanase activity of the latter is not contemplated for practice of this invention. Therefore, since prior art teachings with regard to cultivation of *Trichoderma harzianum* for mutanase, recovery of the mutanase from the culture broth in concentrated form, etc. constitute relevant background knowledge in the art to the glucanase employed in practice of this invention, further discussion of the invention will refer to the glucanase from *Trichoderma harzianum* as mutanase. The specific examples directed to practice of this invention hereinafter provided will describe dosages of the glucanase by their mutanase activity units.

DETAILS OF THE INVENTION

The improvement in filterability can be effected at virtually any stage of the conventional wine making processes with the proviso, however, set forth supra in connection with the optional bentonite treatment of white wines or musts. The must may be treated with mutanase or, if desired, the wine may be treated preferably just prior to filtration. Fortuitously, but advantageously, the mutanase product exhibits an acceptable activity level throughout the pH range of from 3 to 7. This range includes the normal pH of musts as well as that of wines.

However, it should be borne in mind in terms of selecting a point in the wine making process for mutanase treatment that the enzymatic action is dependent upon treatment time and dosage and, therefore, prolongation of the time for enzyme treatment to a week or more will allow a reduction of the dosage vis a vis an 8 hour or 12 hour treatment time. In addition, while the enzyme activity is acceptable, but not necessarily optimal over the entire pH range, the pH of the wine or must does affect the activity and, therefore, the treatment at a less than optimum pH will require an increased dosage vis a vis treatment at optimum pH. By way of example, the enzyme at 2 grams per hectoliter has a good effect within a week, as does 4 grams per hectoliter in 48 hours, both at room temperature and the natural pH of wines.

Normally, the treatment would be carried out at ambient temperature. With a fixed duration of enzyme treatment an increase in temperature will usually allow a decrease to be made in enzyme dosage and vice versa.

A preferred practice of the present invention is to treat the wine or must with mutanase just prior to the bentonite treatment, because little or no enzyme activity remains in the wine or must thereafter. In the production of white wines where the bentonite is added to the wine (i.e., after fermentation), the enzyme should preferably be added before the commencement of fermentation to allow for its action throughout the fermentation period. However, it is still possible to carry out a second mutanase treatment of the wine after the fermentation, but prior to the bentonite treatment and subsequent filtration. However, particularly in Germany and Austria, where in certain instances the protein level of the must is quite high and protein is removed by a bentonite treatment of the must (i.e., prior to fermentation), a preferred practice of this invention for such instances is to treat the must by adding the enzyme preparation immediately after pressing. This may then necessitate a reduction of the incubation time, for example, to as little as 12 hours, which again may require a corresponding increase in dosage of the mutanase product.

For red wines, the maturation step which follows removal of the pomace is a convenient stage for mutanase treatment. However, it may be mentioned also that the tannin content of the wine should be considered when estimating the enzyme dosage to be employed. Generally, increased amounts of tannin reduce the activity of the enzyme preparation and larger quantities of mutanase should be employed.

For further understanding of the invention, reference is made to the attached drawings which illustrate practice of the invention in relation to standard wine making procedures.

Figure 1:
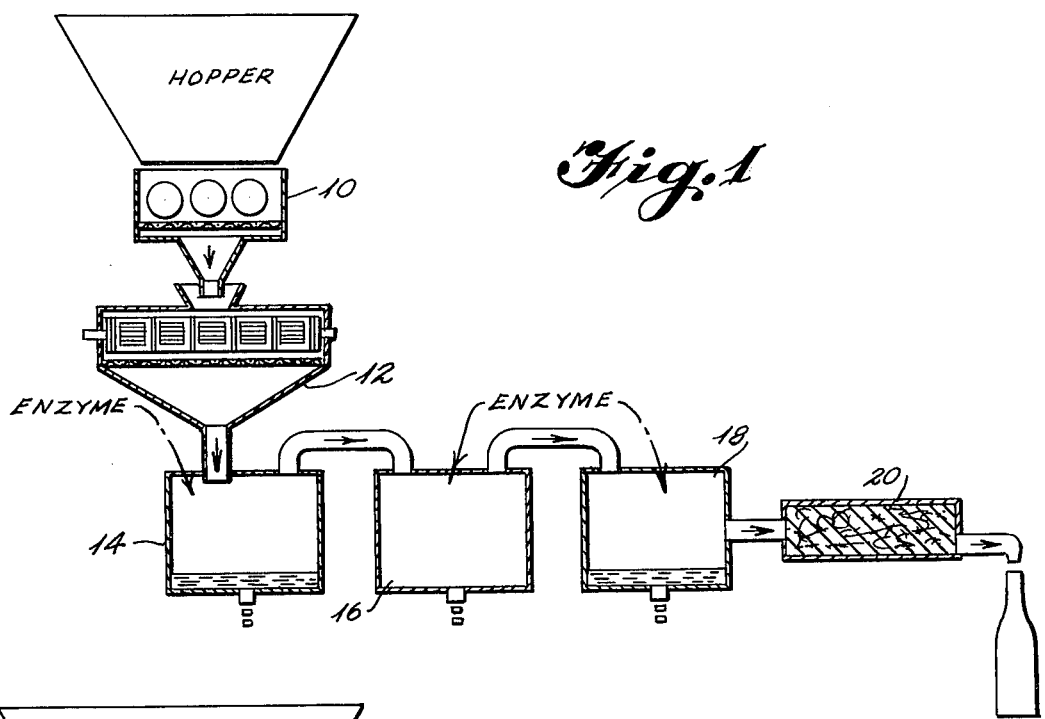
FIG. 1 shows a typical white wine making process.

As may be seen in FIG. 1, the usual white wine making process involves delivering grapes directly to a crusher 10, whereafter the grapes are pressed by 12 after which the pomace cake is removed and the juice left in the decantation tank 14. The must is then transferred to fermentation tank(s) 16 and after fermentation, the wine is sent to a clarification-maturation (or fining) tank 18. As has already been indicated, the mutanase product may be added at the pomace cake removal stage of 14 or alternatively before the fermentation stage in tank 16 or even, if desired, at the clarification and maturation stage in tank 18. All of these stages in the wine making process take place before the wine is passed to a set of filters 20 prior to being bottled.

Figure 2:
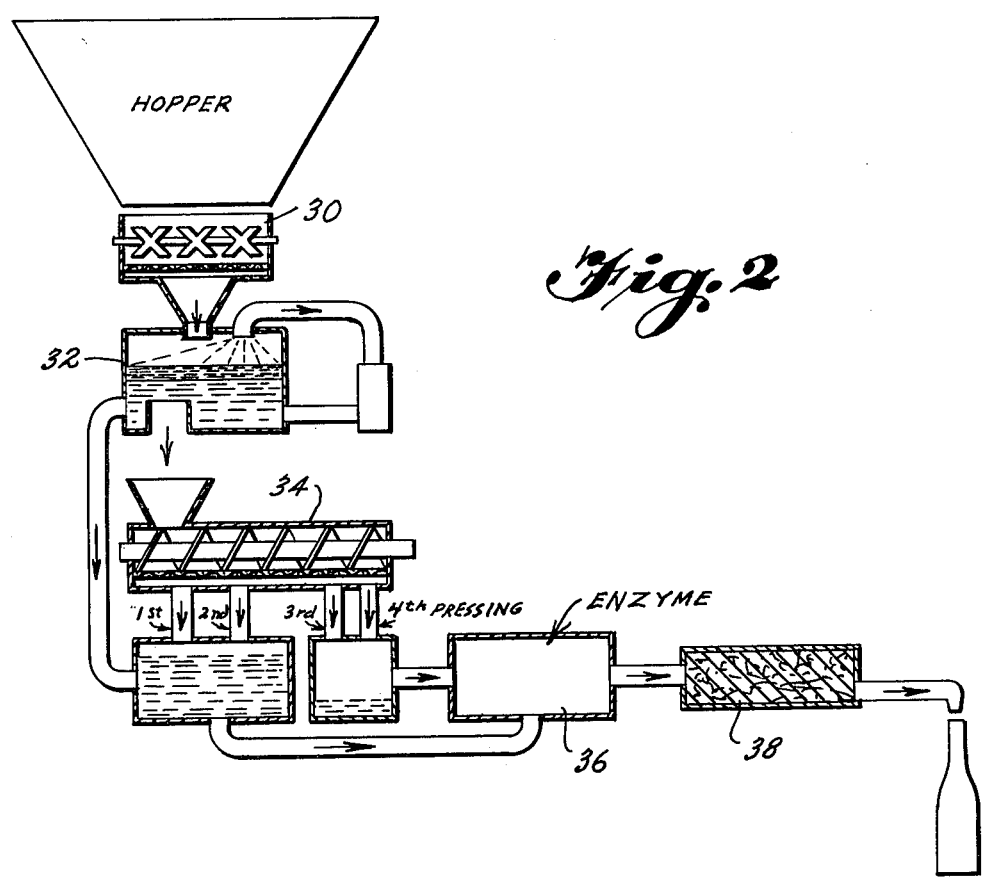
FIG. 2 shows a typical red wine making process.

As indicated on the flow chart of FIG. 2 for typical red wine processing, the most convenient locale for the enzymatic treatment with mutanase is at the clarification and muturation stage. Grapes for production of red wine are de-stemmed and crushed as indicated on the drawing at 30. However, the entire mash then is fermented in the fermentation system 32. Only after fermentation is the red wind subjected to a separation at the screw press 34 to remove the pomace therefrom, which operation usually requires several pressings as shown in the drawing. Thus, only in the clarification-maturation tank 36 is the red wine conveniently collected and available for carrying out an enzyme treatment process thereon.

Subsequent to clarification and maturation, the wine is subjected to filtration 38 and eventually bottled.

Figure 3:
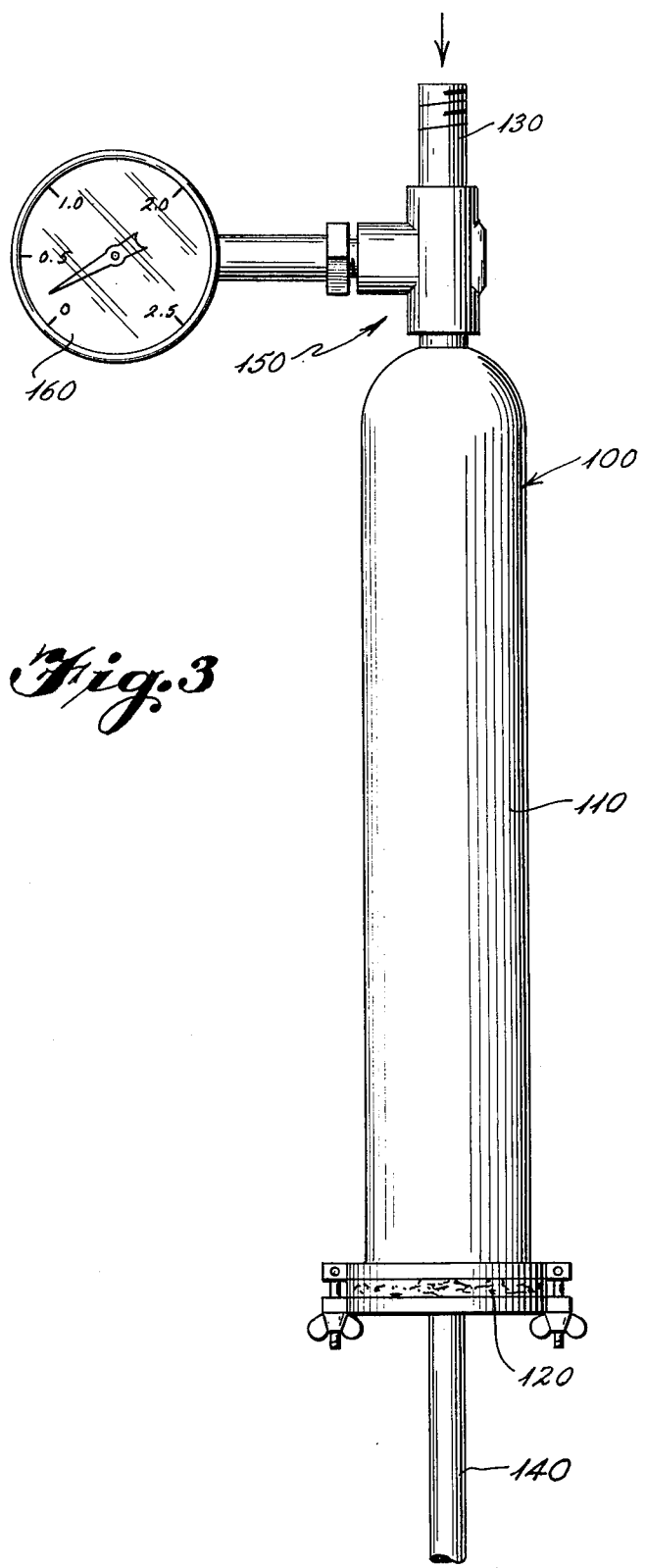
FIG. 3 illustrates diagrammatically a laboratory size filtration unit suited for filterability tests of wine or must.

FIG. 3 illustrates the laboratory filtration unit 100 employed in the test studies on filterability of wines and musts from which the Examples hereinafter provided were drawn. The filtration unit 100 includes a holding chamber 110 which at the bottom is provided with a 20 sq. cm cellulose-asbestos filter pad 120 (K-5, supplied by Filtrox, St. Gallen, Switzerland). The wine or must is charged through inlet pipe 130 to which a source of compressed air is then attached. Inlet pipe 130 is provided with a Tee 150 for placement of a pressure gauge 160. The filtered wine or must is removed through outlet line 140. The amount of filtrate obtained at a filtration pressure of 0.5 bar was weighed on a Mettler PC 4000 balance connected with a W+W recorder 1100 (Kontron, Switzerland).

The mutanase was prepared by cultivation of *Trichoderma harzianum* CBS No. 243.71, and the enzyme product was recovered as described in Great Britain Pat. No. 1,373,487, for exmple by precipitation with ammonium sulphate.

Since Botrytis infected musts and wines are only available during specific time intervals of the season for wine making, some of the experiments from which Examples hereinafter provided were taken, had to be conducted with non-infected (commercial) wine to which was added a certain amount of beta-glucan prepared by cultivating a pure culture of *Botrytis cinerea*. A culture of the particular strain used for that purpose was deposited with Deutsche Sammlung von Mikroorganismen, Göttingen, BRD, on the 19th of May, 1981, and was designated by deposit number DSM 2096. The beta-glucan was prepared by following the procedure in Example A hereinafter provided.

The following examples are presented for further understanding of the practice of the present invention.

EXAMPLE A

Preparation of Botrytis cinerea beta-glucan

The strain DSM 2096 was propagated on agar slants for 2 weeks at 25° C. on a substrate of the following composition:
Yeast Extract—10 g,
Peptone—20 g,
Glucose—30 g,
Bacto-agar(Difco)—20 g,
Distilled water up to—1 liter.
A liquid minimal medium was prepared as follows:
NaNO$_3$—3 g
KH$_2$PO$_4$—1 g
MgSO$_4$,7H$_2$O—0.5 g
KCl—0.5 g
Tartaric acid—5 g
Glucose—140 g
Asparagine—0.5 g
Distilled water up to—1 liter The pH was adjusted to 3.2 prior to sterilization at 130° C. for 30 minutes. The final medium was distributed to shake flasks. The shake flasks were inoculated and the cells grown for two weeks at 25° C., whereafter the mycelium was removed by filtration through glass wool. The filtrate containing the major part of glucan was used for the subsequent operations. The recovered mycelium was suspended in water (5–10 ml of water per gram of mycelium) and homogenized for 5 minutes in a Turmix blender. Finally, the mixture was filtered once more through glass wool. The glucan was precipitated from the combined filtrates by addition of ethanol (0.6 volume of 96% per volume of filtrate). The precipitated glucan was collected by centrifugation (20 minutes, 4500 rpm). The sediment, suspended in 96% alcohol, was centrifuged again. This procedure was repeated three times. The purified sediment was suspended in water to produce an 0.1 percent suspension and then sonicated during 10 minutes at 100 W (MSE). The treated sample was centrifuged at 5000 rpm during 20 minutes and the clear supernatant dialyzed and lyophilized.

EXAMPLE 1

Filtration Experiments with Beaujolais Red Wine

Beaujolais wind (pH 3.35) from Botrytis infected grapes was received from Institut Technique du Vin, Villefranche sur Saone (France) and used for the following tests, 500 ml portions being used for each filtration experiment in the filter unit illustrated in FIG. 3 with a pressure of 0.5 bar applied over the liquid in the filter chamber.

The wine was treated for three different incubation periods (3, 10 and 21 days) at room temperature (18°–20° C.) with dosages corresponding to 0.1; 0.3; 0.5; 1.0 and 2.0 grams per hectoliter of a mutanase product with an activity of 1000 mutanase units per g. The filtration technique was that described above in connection with FIG. 3 of the drawings. Prior to filtration, the samples were centrifuged on a SORVALL Superspeed (RC 2-B) centrifuge for 15 minutes at 2500 rpm.

Tables 1–3 show the results obtained after 3, 10 and 21 days of incubation, respectively. The results for 3 days of incubation shown in Table 1 indicate clearly that at a dosage of 0.1 g/hl no effect at all was observed, and that at 0.3 g/hl the effect was barely detectable. Only dosages of 1 and 2 g/hl gave positive results with a three day incubation period.

TABLE 1

| | Incubation time: 3 days (67 hours) | | | | | |
|---|---|---|---|---|---|---|
| | | Amount of filtrate (grams) at dosage level of mutanase (g/hl) | | | | |
| Filtration time (minutes) | Control (no enzyme) | 0.1 | 0.3 | 0.5 | 1.0 | 2.0 |
| 1 | 30 | 30 | 30 | 40 | 50 | 60 |
| 2 | 50 | 50 | 50 | 70 | 100 | 130 |
| 3 | 60 | 60 | 65 | 100 | 150 | 200 |
| 4 | 70 | 70 | 80 | 122 | 200 | 272 |
| 5 | 75 | 75 | 90 | 142 | 250 | 340 |
| 6 | 80 | 80 | 100 | 160 | 290 | 400 |
| 7 | 80 | 80 | 110 | 175 | 330 | 455 |
| 8 | 82 | 82 | 118 | 190 | 370 | 510 |

TABLE 2

| | Incubation time: 10 days | | | | | |
|---|---|---|---|---|---|---|
| Filtration time (minutes) | Control no enzyme | Amount of filtrate (grams) at dosage level of mutanase (g/hl) | | | | |
| | | 0.1 | 0.3 | 0.5 | 1.0 | 2.0 |
| 1 | 30 | 30 | 35 | 30 | 70 | 80 |

TABLE 2-continued

| | Incubation time: 10 days | | | | | |
|---|---|---|---|---|---|---|
| Filtration time | Control no | Amount of filtrate (grams) at dosage level of mutanase (g/hl) | | | | |
| (minutes) | enzyme | 0.1 | 0.3 | 0.5 | 1.0 | 2.0 |
| 2 | 50 | 45 | 60 | 50 | 140 | 170 |
| 3 | 65 | 55 | 80 | 75 | 205 | 252 |
| 4 | 75 | 65 | 90 | 90 | 270 | 350 |
| 5 | 80 | 70 | 105 | 110 | 325 | 430 |
| 6 | 85 | 75 | 115 | 125 | 380 | 510 |
| 7 | 88 | 80 | 120 | 140 | 425 | |
| 8 | 90 | 80 | 125 | 150 | 470 | |

TABLE 3

| | Incubation time: 21 days | | | | | |
|---|---|---|---|---|---|---|
| Filtration time | Control no | Amount of filtrate (grams) at dosage level of mutanase (g/hl) | | | | |
| (minutes) | enzyme | 0.1 | 0.3 | 0.5 | 1.0 | 2.0 |
| 1 | 30 | 25 | 35 | 35 | 60 | 78 |
| 2 | 52 | 40 | 55 | 55 | 118 | 160 |
| 3 | 68 | 58 | 15 | 75 | 170 | 242 |
| 4 | 75 | 65 | 70 | 90 | 225 | 320 |
| 5 | 70 | 70 | 80 | 110 | 270 | 395 |
| 6 | 85 | 75 | 88 | 120 | 318 | 470 |
| 7 | 88 | 78 | 90 | 130 | 360 | |
| 8 | 90 | 80 | 100 | 140 | 390 | |

EXAMPLE 2

Filtration Experiments with mutanase, FINIZYM ® and CEREFLO ®

A white wine obtained by fermentation of commercial grape juice was used for these trials. This wine originally contained no glucan at all (no wine containing glucan was available at the time). Therefore, beta-glucan (60 mg/l) produced according to Example A was added before the enzyme treatment was started. The following enzyme dosages were used:
Mutanase—0.5; 1.0; 4.0 g/hl,
FINIZYM ®—200 g/hl
CEREFLO ®—200 g/hl.

The control samples before and after addition of beta-glucan were also tested by filtration. The time of incubation with mutanase was 48 h at 19°–20° C. The filtration procedure was the same as that of Example 1. The results obtained are shown in tables 1 and 2.

TABLE 1

| | Amount of filtrate (grams) at dosage level of mutanase (g/hl) | | | | |
|---|---|---|---|---|---|
| | Controls | | | | |
| Filtration time (minutes | No beta-glucan no enzyme | No enzyme | 0.5 | 1.0 | 4.0 |
| 1 | 100 | 52 | 100 | 100 | 90 |
| 2 | 230 | 102 | 198 | 200 | 190 |
| 3 | 370 | 160 | 300 | 310 | 290 |
| 4 | 520 | 215 | 390 | 410 | 380 |
| 5 | | 268 | 470 | 510 | 470 |
| 6 | | 315 | | | |
| 7 | | 360 | | | |
| 8 | | 400 | | | |

Table 1 shows that at such a low beta-glucan level (60 mg/l) the action of 0.5 and 1.0 g/hl of mutanase for 48 h at 20° C. suffices to improve the filterability of the wines. A higher dosage (4 g/hl) does not give a better result in this case.

Table 2 shows that FINIZYM ®, even at a high dosage (100 g/hl) fails to improve the filtration rate. Incubation with a massive dosage (200 g/hl) of FINIZYM ®200 L slightly improves the filterability, but not to the extent obtained with mutanase (0.5 g/hl). A similar dosage of CEREFLO ®200 L (200 g/hl) was without any effect.

TABLE 2

| | Amount of filtrate (grams) at dosage level of enzyme (g/hl) | | | | | |
|---|---|---|---|---|---|---|
| | Controls | | | | | |
| Filtration time | No beta-glucan | No | Finizym 200 L | | | CEREFLO 200 L |
| (minutes) | no enzyme | enzyme | 50 | 100 | 200 | 200 |
| 1 | 100 | 60 | 50 | 60 | 70 | 55 |
| 2 | 248 | 115 | 105 | 110 | 92 | 110 |
| 3 | 400 | 180 | 160 | 180 | 208 | 170 |
| 4 | 560 | 240 | 215 | 240 | 285 | 225 |
| 5 | | 295 | 270 | 298 | 345 | 280 |
| 6 | | 350 | 315 | 350 | 400 | 330 |
| 7 | | 395 | 360 | 390 | 450 | 372 |
| 8 | | 440 | 400 | 440 | 495 | 415 |

EXAMPLE 3

Filtration experiments with mutanase and CELLUCLAST ®.

Samples of different types of wine and grape juice from Botrytis infected grapes were treated with different dosages of mutanase and CELLUCLAST. The enzymes were added to grape juice drawn just prior to the start of the alcoholic fermentation, and to wines drawn a few weeks after the alcoholic fermentation. In each case the treated quantity was 450 ml of wine or juice. After an incubation period, ranging from 24 hours to 2 weeks, the samples were subjected to the filterability test described in Example 1. The results obtained are shown in the tables.

TABLE 1

| | Substrate: Grape Juice (Chasselas, Switzerland) | | | | |
|---|---|---|---|---|---|
| | Incubation time: 24 hours | | | | |
| Filtration time | Amount of filtrate (grams) at dosage level (g/hl) of mutanase | | | | |
| (minutes) | Control (no enzyme) | 1 | 2 | 3 | 4 |
| 1 | 45 | 100 | 75 | 60 | 64 |
| 2 | 70 | 178 | 148 | 118 | 128 |
| 3 | 80 | 234 | 212 | 178 | 192 |
| 4 | 88 | 290 | 279 | 239 | 260 |
| 5 | 90 | 340 | 331 | 295 | 320 |
| 6 | 95 | | | 349 | 372 |
| 7 | 98 | | | 398 | |
| 8 | 100 | | | | |

TABLE 2

| | Substrate: Wine (Chasselas, Switzerland) | | | |
|---|---|---|---|---|
| | Incubation time: 24 hours | | | |
| Filtration time | Amount of filtrate (grams) at dosage level (g/hl) of mutanase | | | |
| (minutes) | Control (no enzyme) | 2 | 3 | 4 |
| 1 | 45 | 60 | 72 | 73 |
| 2 | 75 | 118 | 151 | 158 |
| 3 | 93 | 180 | 238 | 244 |
| 4 | 110 | 244 | 320 | 330 |
| 5 | 118 | 303 | | |
| 6 | 125 | 363 | | |
| 7 | 130 | 395 | | |
| 8 | 198 | | | |

TABLE 3

Substrate: Grape juice (Chasselas, Switzerland)
Incubation time: 48 hours

| Filtration time (minutes) | Control (no enzyme) | Amount of filtrate (grams) at dosage level (g/hl) of mutanase | | | |
|---|---|---|---|---|---|
| | | 1 | 2 | 3 | 4 |
| 1 | 45 | 58 | 59 | 64 | 69 |
| 2 | 70 | 118 | 119 | 126 | 140 |
| 3 | 80 | 180 | 181 | 191 | 211 |
| 4 | 88 | 240 | 242 | 255 | 280 |
| 5 | 90 | 293 | 300 | 314 | 340 |
| 6 | 95 | 342 | 354 | 369 | |
| 7 | 98 | 389 | 401 | | |
| 8 | 100 | | | | |

TABLE 4

Substrate: Wine (Chasselas, Switzerland)
Incubation time: 48 hours

| Filtration time (minutes) | Control (no enzyme) | Amount of filtrate (grams) at dosage level (g/hl) of mutanase | | |
|---|---|---|---|---|
| | | 2 | 3 | 4 |
| 1 | 45 | 65 | 70 | 75 |
| 2 | 75 | 138 | 150 | 160 |
| 3 | 93 | 213 | 230 | 251 |
| 4 | 110 | 289 | 309 | 339 |
| 5 | 118 | 358 | 369 | |
| 6 | 125 | 388 | | |
| 7 | 130 | | | |
| 8 | 138 | | | |

TABLE 5

Substrate: Grape juice (Chasselas, Switzerland)
Incubation time: 1 week

| Filtration time (minutes) | Control (no enzyme) | Amount of filtrate (grams) at dosage level (g/hl) of enzyme | | | | | |
|---|---|---|---|---|---|---|---|
| | | Mutanase | | | | | CELLUCLAST 200L |
| | | 1 | 2 | 3 | 4 | 6 | 30 |
| 1 | 45 | 75 | 76 | 82 | 89 | 84 | 40 |
| 2 | 70 | 152 | 152 | 168 | 180 | 171 | 60 |
| 3 | 80 | 231 | 230 | 245 | 270 | 261 | 73 |
| 4 | 88 | 300 | 300 | 320 | 350 | 340 | 80 |
| 5 | 90 | 364 | 364 | 386 | | | 83 |
| 6 | 95 | | | | | | 88 |
| 7 | 98 | | | | | | 90 |
| 8 | 100 | | | | | | 90 |

TABLE 6

Substrate: Wine (Chasselas, Switzerland)
Incubation time: 1 week

| Filtration time (minutes) | Control (no enzyme) | Amount of filtrate (grams) at dosage level (g/hl) of enzyme | | | | | |
|---|---|---|---|---|---|---|---|
| | | Mutanase | | | | | CELLUCLAST 200 L |
| | | 1 | 2 | 3 | 4 | 6 | 30 |
| 1 | 45 | 81 | 100 | 108 | 120 | 100 | 55 |
| 2 | 75 | 178 | 215 | 220 | 238 | 215 | 90 |
| 3 | 93 | 270 | 319 | 329 | 341 | 320 | 115 |
| 4 | 110 | 350 | 409 | 422 | | | 130 |
| 5 | 118 | | | | | | 140 |
| 6 | 125 | | | | | | 148 |
| 7 | 130 | | | | | | 150 |
| 8 | 148 | | | | | | 158 |

TABLE 7

Substrate: Wine (Chasselas, Switzerland)
Incubation time: 64 hours

| Filtration time (minutes) | Control (no enzyme) | Amount of filtrate (grams) at dosage level (g/hl) of CELLUCLAST 100 L and 200 L | |
|---|---|---|---|
| | | 100 (100 L) | 50 (200 L) |
| 1 | 38 | 40 | 32 |
| 2 | 58 | 65 | 50 |
| 3 | 70 | 79 | 62 |
| 4 | 80 | 89 | 70 |
| 5 | 85 | 95 | 75 |
| 6 | 90 | 100 | 80 |
| 7 | 95 | 105 | 82 |
| 8 | 98 | 108 | 85 |

TABLE 8

Substrate: Grape juice (Muscat, Breisach, BRD)
Incubation time: 1 week

| Filtration time (minutes) | Control (no enzyme) | Amount of filtrate (grams) at dosage level (g/hl) of enzyme | | | | | | |
|---|---|---|---|---|---|---|---|---|
| | | Mutanase | | | | | CELLUCLAST 200 L | |
| | | 1 | 2 | 3 | 4 | 6 | 10 | 30 |
| 1 | 35 | 59 | 72 | 80 | 85 | 89 | 40 | 45 |
| 2 | 58 | 117 | 144 | 160 | 169 | 176 | 68 | 78 |
| 3 | 78 | 172 | 211 | 239 | 240 | 258 | 90 | 100 |
| 4 | 90 | 228 | 270 | 300 | 300 | 321 | 110 | 125 |
| 5 | 98 | 275 | 320 | 357 | 354 | 380 | 130 | 142 |
| 6 | 120 | 319 | 368 | 405 | 400 | | 148 | 160 |
| 7 | 135 | 359 | 407 | | | | 162 | 178 |
| 8 | 150 | 391 | | | | | 178 | 190 |

TABLE 9

Substrate: Wine (Bordeaux)
Incubation time: 1 week

| Filtration time (minutes) | Control (no enzyme) | Amount of filtrate (grams) at dosage level (g/hl) of enzyme | | | |
|---|---|---|---|---|---|
| | | Mutanase | | | CELLUCLAST 200 L |
| | | 2 | 3 | 4 | 30 |
| 1 | 38 | 89 | 100 | 109 | 38 |
| 2 | 50 | 182 | 202 | 221 | 52 |
| 3 | 58 | 271 | 299 | 330 | 65 |
| 4 | 60 | 341 | 377 | 420 | 70 |
| 5 | 68 | 401 | | | 78 |
| 6 | 70 | | | | 80 |
| 7 | 75 | | | | 85 |
| 8 | 78 | | | | 88 |

The data show that only mutanase was effective, CELLUCLAST being almost inactive even at a high dosage level. It can be concluded that incubation with a mutanase dosage of 2 g/hl at 20° C. for about one week should be sufficient to obtain a satisfactory filtration rate.

EXAMPLE 4

Bordeaux white wine (5 l) obtained from Botrytis infected grapes was treated with mutanase (4 g/hl) at room temperature (16°–17° C.). The glucan was degraded after 56 hours (as checked by the alcohol test: 1 vol of wine+0,5 vol of ethanol (96%) gave no precipitation after 5 minutes). Following incubation for a total of 6 days, diatomaceous earth (3 g/hl of Fw 14, Celatom, USA) was added, and the filtration was performed under nitrogen pressure (0.6 bar) at 20° C. through a filter surface of 23.2 sq.cm.

The following table shows the filtration rate of treated compared with that of untreated wine.

| Filtration time (minutes) | Amount of filtrate (grams) at dosage level (g/hl) of enzyme | |
| --- | --- | --- |
| | Control (no enzyme) | With mutanase (4 g/hl) |
| 1 | 150 | 800 |
| 2 | 170 | 1100 |
| 3 | 180 | 1400 |
| 6 | 210 | 1900 |
| 10 | 230 | 2300 |
| 12 | 240 | 2600 |
| 15 | 255 | 2900 |
| 18 | 260 | 3200 |
| 21 | 270 | 3400 |

The results show that glucanase at a dosage level of 4 g/hl after incubation at 16°–17° C. for one week improves the filtration rate by a factor of more than 10.

I claim:

1. A process for improving the filterability of must from Botrytis infected grapes and of wine produced by fermentation thereof, which comprises contacting said must or wine with a glucanase product exhibiting beta-glucanase activity produced by *Trichoderma harzianum* in amount effective to improve filterability for between 8 hours and 2 weeks at a temperature in the range of from 15° C. to 50° C. and at a pH in the range of from 3 to 5.

2. The process according to claim 1 wherein the glucanase product contains alpha-glucanase activity present essentially as mutanase activity and said amount of glucanase product provides from 250 to 10,000 mutanase units per hectoliter of the must or wine.

3. The process of claim 1 in which said amount of glucanase product provides from 50 to 5000 beta-glucanase units per hectoliter of wine or must.

4. The process according to claim 1 in which the wine is white wine.

5. The process according to claim 4 in which the contacting with glucanase product is followed by of the must or wine with bentonite.

6. The process according to claim 5 in which the contacting with glucanase product is followed by fermentation.

7. The process according to claim 1 in which the wine is red wine.

8. The process according to claim 7 in which the contacting with glucanase product follows fermentation.

* * * * *